United States Patent [19]
Harmon

[11] Patent Number: 5,979,994
[45] Date of Patent: Nov. 9, 1999

[54] VEHICLE WHEEL PROTECTOR

[76] Inventor: James A. Harmon, 3930 Cherry St., Tampa, Fla. 33607

[21] Appl. No.: 09/096,650

[22] Filed: Jun. 12, 1998

[51] Int. Cl.$^6$ .............................. B60B 7/06; B05C 21/00; B32B 3/10
[52] U.S. Cl. .......................................... 301/37.1; 118/504
[58] Field of Search ................................ 301/37.1, 37.42; 118/504, 505

[56] References Cited

U.S. PATENT DOCUMENTS

| | | | |
|---|---|---|---|
| 4,628,858 | 12/1986 | King et al. ............................... | 118/504 |
| 4,787,331 | 11/1988 | Jarvis ....................................... | 118/504 |
| 5,354,614 | 10/1994 | Cox et al. ............................. | 118/504 X |
| 5,658,632 | 8/1997 | Krabill .................................. | 118/505 X |
| 5,759,276 | 6/1998 | Addison, Jr. ........................ | 301/37.1 X |

*Primary Examiner*—Russell D. Stormer
*Attorney, Agent, or Firm*—Ronald E. Smith; Smith & Hopen, P.A.

[57] ABSTRACT

A wheel protector has utility in protecting a wheel when a chemical solution is applied to a tire which is mounted upon the wheel where the solution lengthens the lifetime and enhances the aesthetic appeal of the tire. The wheel protector includes a flat, rectangular shield formed of a flexible material that partially surrounds the wheel during the application of the chemical solution to the tire. The shield is moved as needed to complete an application. The shield is formed of a resilient material and is curved to match the radius of the wheel when in us. A shape retainer, preferably formed of aluminum, is secured to the shield during use to prevent the shield from flattening out. The shield is secured to the shape retainer by a strip of hook and loop fastening material secured to the shield that mates with a complementary strip of hook and loop fastening material that is secured to the shape retainer. After use, the shield is easily detached from the shape retainer and the shape retainer is bent to conform to the radius of another wheel as needed.

10 Claims, 2 Drawing Sheets

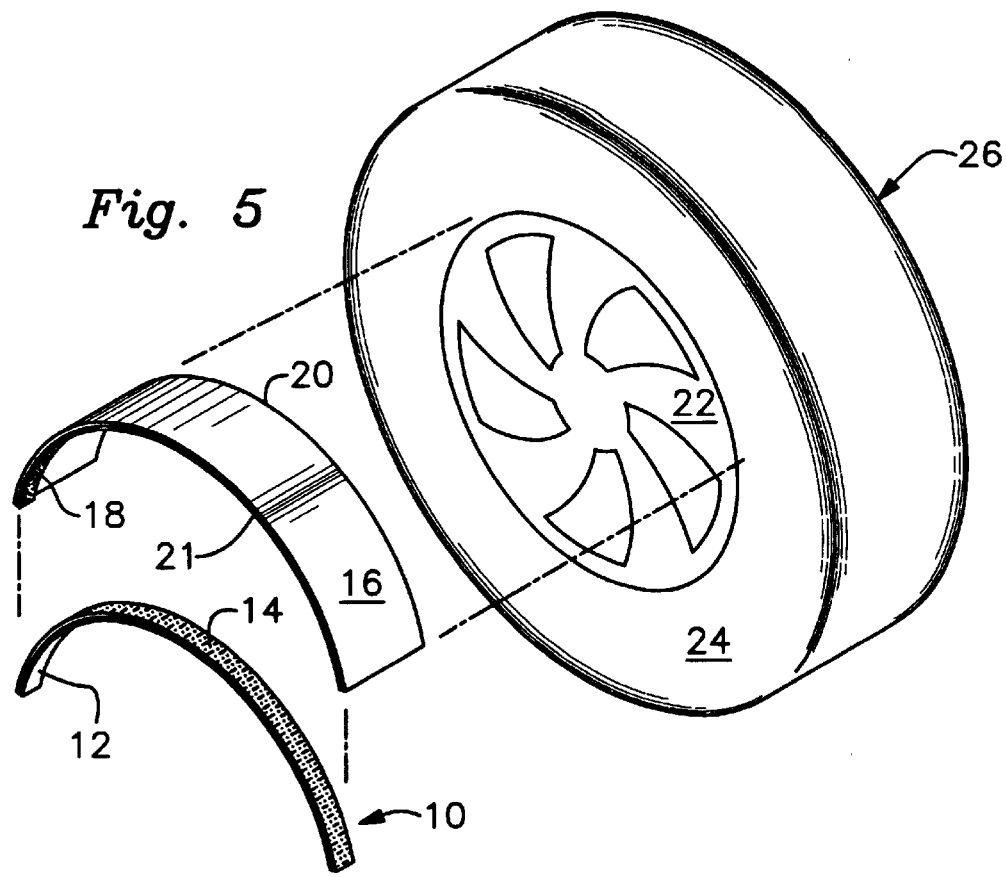
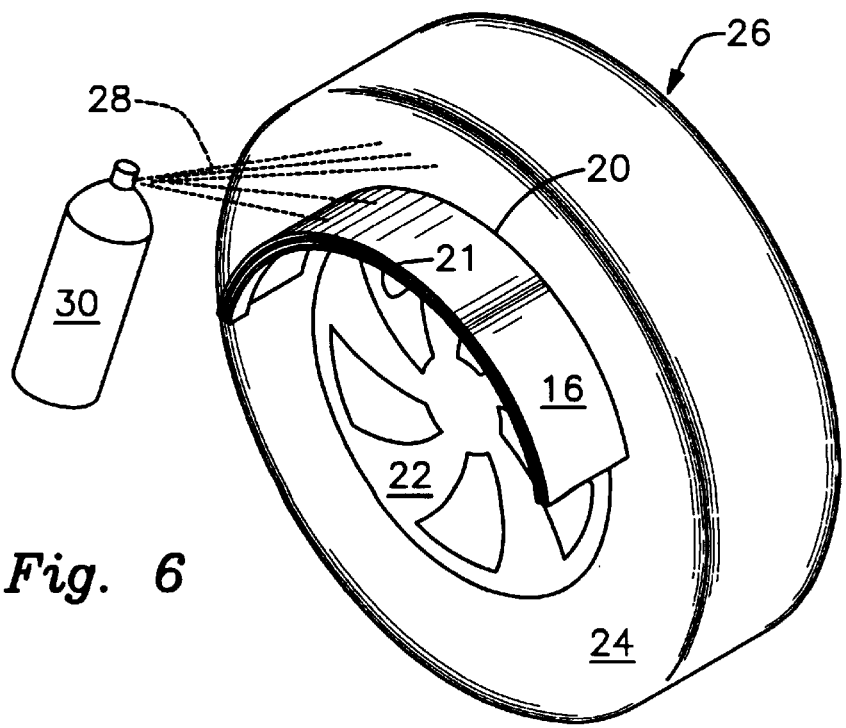

VEHICLE WHEEL PROTECTOR

BACKGROUND OF THE INVENTION

1. Field of the Invention

This invention relates, generally, to devices that cover wheels while a tire mounted on the wheel is being treated with a chemical solution. More particularly, it relates to a device that adjusts to many different sizes yet which has an elegant structural simplicity.

2. Description of the Prior Art

If left unprotected, tire sidewalls can crack or harden when exposed to ultraviolet radiation and other natural phenomenon. To prolong the lifetime of tire sidewalls, chemists have developed a number of protective coatings that block or inhibit penetration of ultraviolet rays, that inhibit or delay cracking and hardening of the sidewalls, and that generally prolong the aesthetic appearance of the tire sidewalls. Depending upon the characteristics of the protectant, the chemical may be applied by spraying or with a cloth, sponge, and the like.

Regardless of the application method selected, the wheel upon which the tire is mounted should be protected from the chemical being applied to the sidewalls so that the chemical is applied only to the sidewalls and not to the wheel rim or hubcap. Over the years, inventors have developed a number of differing wheel protectors. All of them are believed to perform their intended function, but the art still has not reached its highest pinnacle of development.

For example, one of the best solutions to the wheelmasking problem is disclosed in U.S. Pat. No. 4,792,191 to Farmer. A circular disc is formed into a cone; the cone is held at its apex and its annular rim is disposed into covering relation to the wheel upon which a tire is mounted. Advantageously, the diameter of the annular rim may be varied by changing the position of tab members which are inserted into slots. This allows the device to be used to protect or mask wheels of differing diameters.

There are still a few drawbacks with the cone design, however. First of all, the diameter of the cone is not infinitely variable; thus, a particular wheel diameter might be somewhere between two tab and slot settings. Secondly, the depth of the cone may be insufficient to receive protrusions from some hubcaps. Thirdly, the cone requires a substantial amount of material. Moreover, the cone is highly resilient so that it quickly returns to its flat configuration if a tab slips out of a slot.

Thus, there is a need for a wheel shield having an infinitely variable radius so that it can be used to mask wheels of all diameters. There is a further need for a wheel shield that can accommodate any hubcap protrusions. Moreover, there is a need for a wheel shield that requires less material than a cone-shaped shield, and there is a need for a shield that is not subject to failure in the event of slippage.

However, in view of the art considered as a whole at the time the present invention was made, it was not obvious to those of ordinary skill in this art how the needed improvements could be provided.

SUMMARY OF THE INVENTION

The long-standing but heretofore unfulfilled need for an apparatus that overcomes the limitations of the prior art is now met by a new, useful, and nonobvious invention. The present invention provides a wheel protector that shields a vehicle wheel when a chemical solution is applied to a sidewall of a tire mounted upon the wheel. The novel wheel protector includes an elongate, flexible, shape-retaining means, a first strip of fastening material secured to the shape-retaining means, a flat, flexible, rectangular shield means, and a second strip of fastening material secured to the shield means. The shield means is preferably formed of a resilient, elastomeric material. The first and second strips of fastening materials are complementary to one another and releasably engage one another when brought into abutting contact with one another. A wheel is protected by bending the shape-retaining means to match a radius of a wheel to be protected, by engaging the shield means to the shape-retaining means by bringing the first and second fastening materials into releasable engagement with one another, and by positioning the shield means into wheel-shielding relation to the wheel with a first hand so that the chemical solution may be applied to the tire with a second hand.

The shape-retaining means is preferably a strip of a predetermined metal such as aluminum having a predetermined thickness that enables it to be easily manually bent into any preselected radius of curvature.

The first strip of fastening material has an extent substantially equal to an extent of the shape-retaining means, and the second strip of fastening material has an extent substantially equal to a longitudinal extent of the shield means. The second strip of fastening material is disposed in parallel relation to a longitudinal edge of the shield means.

The first and second strips of fastening materials are complementary hook and loop fastening materials so that after the wheel protector has been used, the shield means is easily detachable from the shape-retaining means so that the shape-retaining means may be manually bent to conform to another radius.

When the shield means is in use, it is oriented in non-interfering relation to a hubcap mounted on the wheel; said orientation places all points on the shield means in equidistant relation to an axis of rotation of the wheel.

It is a primary object of this invention to provide a wheel protector of elegant construction that uses a minimum of material yet which protects wheels of any diameter when a tire-protecting solution is applied to such tire.

Another important object is to provide a wheel protector that accommodates hubcap protrusions of any extent.

Another object is to provide a wheel protector that cannot slip out of position when it is in use.

These and other important objects, features, and advantages of the invention will become apparent as this description proceeds.

The invention accordingly comprises the features of construction, combination of elements and arrangement of parts that will be exemplified in the construction hereinafter set forth, and the scope of the invention will be indicated in the claims.

BRIEF DESCRIPTION OF THE DRAWINGS

For a fuller understanding of the nature and objects of the invention, reference should be made to the following detailed description, taken in connection with the accompanying drawings, in which:

FIG. 5 is a perspective view of a wheel and a tire and an exploded perspective view of the parts depicted in FIGS. 1 and 2 when bent by a user into a radius that matches the radius of the depicted wheel; and FIG. 6 is a perspective view of the novel wheel protector when in its assembled configuration and when positioned in operative engagement with a wheel.

DETAILED DESCRIPTION OF THE PREFERRED EMBODIMENT

Figures 1, 2:
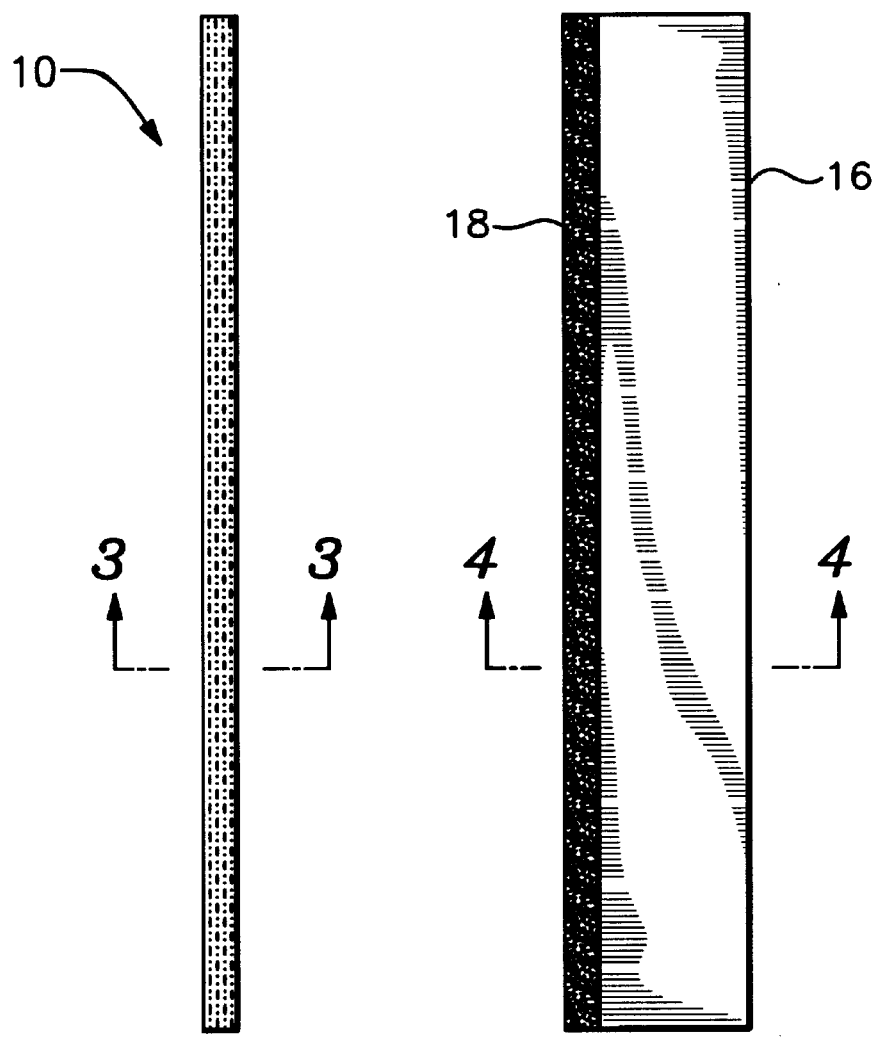
FIG. 1 is a plan view of a shape-retention means that forms a part of the novel wheel protector.
FIG. 2 is a plan view of the flexible base that forms a part of the novel wheel protector.

Referring now to FIG. 1, it will there be seen that an exemplary embodiment of the shape-retaining means of the invention is denoted as a whole by the reference numeral 10. Shape-retaining means 10 is made in part of a flexible, shape-retaining material such as aluminum; other materials, whether metallic or non-metallic, that have the flexibility and shape-retention properties of aluminum are within the scope of this invention.

Figure 3:
FIG. 3 is a sectional view taken along line 3—3 in FIG. 1.

As best understood in connection with FIG. 3, shape-retaining means 10 also includes a base 12 formed of aluminum or other shape-retaining material as aforesaid and a strip 14 of a fastening material such as a hook-and-loop type of fastening material. The fastening material is permanently secured to base 12 by any suitable means.

Figure 4:
FIG. 4 is a sectional view taken along line 4—4 in FIG. 2.

As best understood in connection with FIGS. 2 and 4, shield 16 includes a flat, rectangular-in-configuration sheet of a flexible, resilient material. A strip 18 of a hook-and-loop fastening material is permanently secured thereto by any suitable means. Strip 18 may be positioned along a preselected longitudinal edge of shield 16 as depicted or it may be positioned anywhere between the opposed longitudinal edges thereof, as long as it remains in parallel relation to said longitudinal edges to ensure full mating contact with strip 14 when the device is in use.

As depicted in FIG. 3, material 14 is a hook-carrying material and as depicted in FIG. 4, material 18 is a loop-carrying material. This arrangement is arbitrary and could be reversed without affecting the performance of the inventive wheel protector.

The method of using the novel device is best understood in connection with FIGS. 5 and 6. Shape retaining means 10 is manually bent so that its radius matches the radius of a wheel to be protected. Clearly, the aluminum or equivalent shape-retaining material may be bent into any radius so that the novel wheel protector may be employed to protect wheels of any diameter. Prior to bending, shape-retaining means 10 is oriented so that its strip of fastening material 14 is radially outward of base 12.

Alternatively, strips 14 and 18 are joined together first and then base 12 is bent.

After the bending step has been performed, strip 18 is brought into releasable engagement with strip 14 and flexible wheel protector 16 is bent to conform to the shape of base 12. Leading edge 20 of shield 16 is then positioned into shielding relation to wheel 22 and sidewalls 24 of tire 26 are then sprayed with protectant solution 28 stored under pressure in can 30. Alternatively, a protectant solution may be applied with a cloth, sponge, or the like, i.e., the application need not be made with a spray can. The novel wheel protector is used in the same way, however, regardless of the method employed to apply the tire-protecting chemical or chemicals.

Although leading edge 20 of shield 16 is depicted as being positioned against the wheel to be protected, the novel device could be reversed in position so that opposite longitudinal edge 21 is positioned in shielding relation to the wheel. Either way, the user holds the novel wheel protector in a first hand and applies the protectant solution with the other hand. When a preselected area has been treated, the novel device is repositioned as needed and the next section of tire is treated.

In view of the flat construction of shield 16, it accommodates hubcaps of any shape, including those with outwardly-projecting protrusions. Moreover, since aluminum retains its shape, the device will not pop out of its operable configuration during use.

As understood when viewing FIG. 2, shield 16 requires much less material to make than a cone-shaped wheel protector.

This elegant construction thus uses minimal materials, includes an infinite plurality of positions of functional adjustment so that it has utility with all wheel sizes, has no hubcap clearance problems, and will not flatten out when in use.

It will thus be seen that the objects set forth above, and those made apparent from the foregoing description, are efficiently attained and since certain changes may be made in the foregoing construction without departing from the scope of the invention, it is intended that all matters contained in the foregoing construction or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described,

What is claimed is:

1. A wheel protector that shields a vehicle wheel when a chemical solution is applied to a sidewall of a tire mounted upon said wheel, comprising:

an elongate, flexible, shape-retaining means;

a first strip of fastening material secured to said shape-retaining means;

a flat, flexible, rectangular shield means;

a second strip of fastening material secured to said shield means;

said first and second strips of fastening materials being complementary to one another and releasably engaging one another when brought into abutting contact with one another;

whereby a wheel is protected by bending said shape-retaining means to match a radius of a wheel to be protected, by engaging said shield means to said shape-retaining means by bringing said first and second fastening materials into releasable engagement with one another, and by positioning said shield means into wheel-shielding relation to said wheel with a first hand so that said chemical solution may be applied to said tire with a second hand.

2. The wheel protector of claim 1, wherein said shape-retaining means is a strip of a predetermined metal having a predetermined thickness that enables it to be easily manually bent into any preselected radius of curvature.

3. The wheel protector of claim 2, wherein said predetermined metal is aluminum.

4. The wheel protector of claim 1, wherein said first strip of fastening material has an extent substantially equal to an extent of said shape-retaining means.

5. The wheel protector of claim 1, wherein said shield means is formed of a resilient elastomeric material.

6. The wheel protector of claim 1, wherein said second strip of fastening material has an extent substantially equal to a longitudinal extent of said shield means.

7. The wheel protector of claim 1, wherein said second strip of fastening material is disposed in parallel relation to a longitudinal edge of said shield means.

8. The wheel protector of claim 1, wherein said first and second strips of fastening materials are complementary hook and loop fastening materials so that after the wheel protector has been used, the shield means is easily detachable from the shape-retaining means so that the shape-retaining means may be manually bent to conform to another radius.

9. The wheel protector of claim 1, wherein said shield means, when in use, is oriented in non-interfering relation to a hubcap mounted on said wheel.

10. The wheel protector of claim 9, wherein said orientation places all points on said shield means in equidistant relation to an axis of rotation of said wheel.

* * * * *